Oct. 3, 1939.　　　E. J. FORMHALS　　　2,174,784
PROPORTIONING DEVICE
Filed Aug. 18, 1936　　　2 Sheets-Sheet 1

INVENTOR.
Emil J. Formhals
BY
ATTORNEY.

Oct. 3, 1939.  E. J. FORMHALS  2,174,784
PROPORTIONING DEVICE
Filed Aug. 18, 1936  2 Sheets-Sheet 2
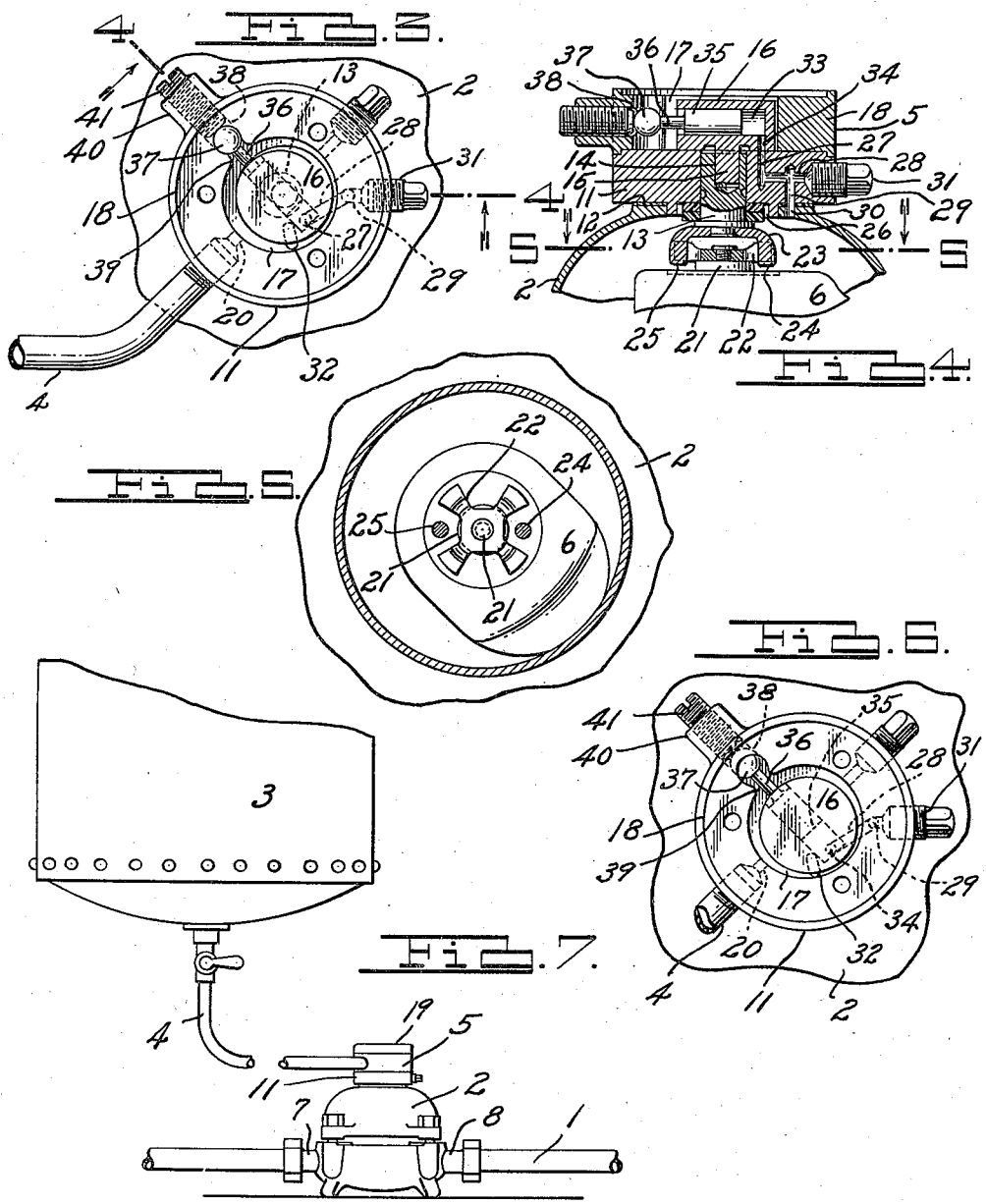
INVENTOR.
Emil J. Formhals
BY
ATTORNEY.

Patented Oct. 3, 1939

2,174,784

UNITED STATES PATENT OFFICE 2,174,784

PROPORTIONING DEVICE

Emil J. Formhals, Detroit, Mich., assignor to Formhals Engineering Company, Detroit, Mich., a corporation of Michigan Application August 18, 1936, Serial No. 96,626

4 Claims. (Cl. 210—40)

This invention relates to proportioning apparatus by means of which a treating liquid is discharged in a proportional amount into another liquid to be treated to provide a desired chemical combination.

The device is usable for various purposes, as for instance, in discharging into boiler feed water a proportionate amount of compound for reducing scale or wherever a liquid of certain chemical properties is to be introduced into another liquid to provide a mixture of the desired respective quantity of both liquids.

The object of this invention is to provide a new and improved apparatus for injecting a measured volume of one liquid into a metered volume of a major liquid both being discharged by the meter in mixture.

A further feature and object of the invention is to provide a proportioning device comprising a meter for a flowing body of major liquid and a pump directly connected to the meter shaft or continuation thereof whereby the pump pulsations are in 1 to 1 relation with the rotation of the meter shaft and functioning to discharge a treating liquid into the main body of liquid to be treated passing through the meter and the volume of which is in direct proportion to the volume of the major liquid.

It is further a feature and object of this invention to provide a proportioning apparatus of the character of a meter having a rotating shaft through which the main body of liquid is passed in measured volume and a pump having a rotating element driven by the meter shaft, the pump being actuated by having a body connected in eccentric relationship with the shaft and the casing of the pump element mounted directly on the meter casing, means being provided to vary the amount of treating liquid discharged by the pump into the main body of the liquid flowing through the meter.

These and other objects and various novel features of the invention are hereinafter more fully described and claimed, and the preferred form of construction of a proportioning device embodying my invention is shown in the accompanying drawings in which—

Fig. 3 is a plan view of the preferred form of pump, the top plate being removed to show the pumping apparatus.

Fig. 4 is a section taken on line 4—4 of Fig. 3.

Fig. 5 is a plan view showing the upper end of the meter shaft and clutch element thereon and section of a clutch element on the pump shaft taken on line 5—5 of Fig. 4.

Fig. 6 is a plan view of the pump with the parts adjusted to vary the stroke.

Fig. 7 is an elevation showing my improved metering device connected with a source of supply of liquid to be discharged by the pump into a meter through which the major liquid to be treated flows.

Figure 1:
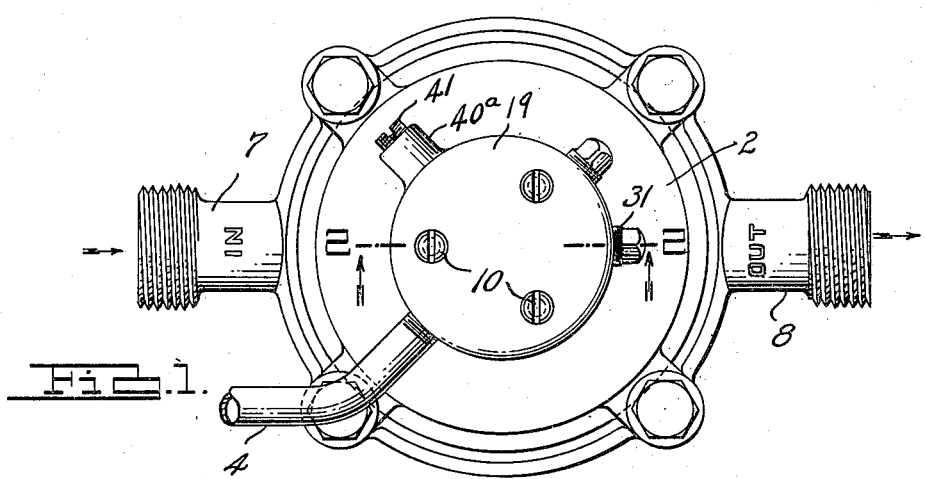
Fig. 1 is a plan view of the apparatus showing the pump casing mounted on the upper end of the meter casing.

It is firstly pointed out that, in the use of a device for injecting a treating fluid into a major liquid to be treated, there are a number of difficulties involved depending upon the character of the liquids to be mixed. The rate of flow of the main body of fluid in different installations varies considerably and the amount of the treating fluid to be utilized also varies greatly. Apparatus for this purpose heretofore in use has therefore been somewhat complicated and costly in construction utilizing reciprocating pumps usually actuated by pressure of the main body of fluid and thus requiring rather expensive valve construction and a complicated means for varying the stroke of the pump and volume of treating liquid to be discharged into the liquid to be treated and a feature of this invention exists in its great simplicity and inexpensiveness in comparison with prior art structures of which I have any knowledge.

In the form of the invention herein shown, the liquid to be treated, as for instance by way of illustration and not by way of limitation, is passed under pressure through a conduit 1 shown in Fig. 7 through a meter, the casing of which is shown at 2 and the treating liquid is here shown as being held in a container 3. A valve controlled conduit 4, leads directly to the pump whose casing is shown at 5. A meter of any approved form and having a rotating shaft 21 is mounted in the casing 2, the upper end of which meter is indicated at 6 in Figs. 2 and 4. The meter, here shown, is of a form actuatable by the flow of fluid through the conduit 1. The meter casing has an inlet end 7 for connection with one part of the conduit and an outlet 8 for connection with a continuation thereof and thus the fluid passes to the outlet in a measured volume. This invention provides a means for injecting a varied volume of treating liquid directly into the meter casing whereby a thorough mixture of the treating and treated liquids results in desired proportion.

The pump may be of various types preferably of a rotary type or having an oscillating element through or by means of which a certain quantity of the treating liquid is discharged into the meter at each revolution of the meter shaft. While this pump may be of various forms, I have here shown the preferred form well adapted for this purpose.

The meter casing has an opening 26 and is provided with a finished upper surface 9 thereabout having apertures to receive screws 10 for securing the pump element in place. The pump element consists of a base 11 mounted on the top of the meter casing there being a packing 12 between said base and surface 9 of the meter casing and the base 11 is centrally apertured to receive a shaft 13. This shaft has an aperture 14 in its end eccentric to the axis thereof to receive a pin 15 here shown as formed integrally with and extending to below the pump body 16. The pump body is here shown as circular in form as will be understood from Fig. 3 and is positioned in a circular recess 17 whose center is on the axis of the shaft 14. The recess 17 is formed in the central element 18 of the pump housing which is secured on the top of the base element 11 as shown more clearly in Figs. 2 and 4 and a cap member 19 provides the upper wall of the chamber in which the pump body 16 is located. Screws 10 pass through these three elements 11, 18 and 19 of the pump casing and securely hold the same in fixed relationship. The central chambered element 18 is provided with an inlet 20 to which the inlet conduit 4 leads from the treating fluid tank 3. The pump body 16 is less in diameter than the diameter of the chamber 17 in which it is mounted and as the pump body 16 is eccentrically mounted in the end of the shaft 13 the pump body is oscillated rather than rotated in the chamber. Rotation of the shaft 13 is caused by a clutch mechanism.

On the top of the shaft 21 for the meter is a four-armed clutch member 22. On the bottom of the shaft 13 is a two-armed clutch element 23, the ends of which are shown at 24 and 25 and positioned between arms of the clutch member 22 of the meter. There is considerable latitude of play between these clutch elements as here shown but this is not material as any clutching means adaptable for the purpose may be utilized, the point being that by having a readily detachable clutch mechanism of the character described, the pump apparatus as a unit may be readily removed as well as the shaft 13 through the opening 26 in the upper part of the meter casing 2.

Figure 2:
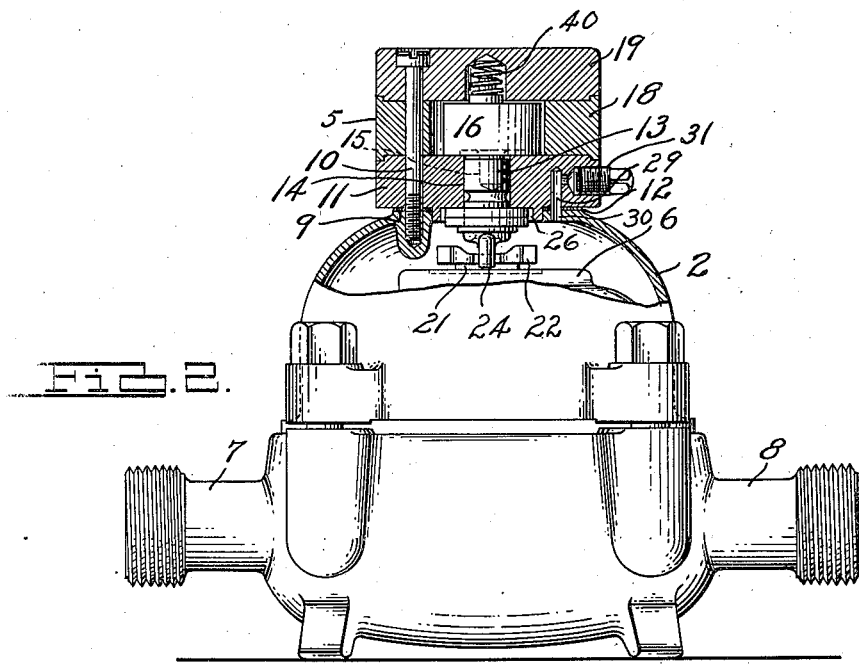
Fig. 2 is a side elevation showing the pump casing and upper part of the meter casing in section on line 2—2 of Fig. 1.

As heretofore stated, whatever pump structure is utilized, it is preferably directly driven by a shaft 13 providing an extension of the meter shaft. Means must also be provided to permit variation in volume of the treating fluid to the volume of the treated fluid flowing through the meter per revolution or per unit of time. The volume of the treated fluid passing through the outlet 8 is determined by the meter and the pump being actuated by the meter shaft, the pump element of the construction shown or in any adaptable pump structure operating in this manner, each revolution of the meter causes a revolution of the pump body and consequently a discharge of a definite amount of the treating liquid at each revolution of the meter. The amount of treating liquid to be discharged therefore may be variable as may be required with different liquids to be combined. In the pump shown, this is accomplished in the following manner:

The base 11 of the pump has a passageway 27 opening through its upper face to the chamber 17 and has a channel 28 as shown in Fig. 3 which leads to a vertical channel 29. The channel 29 in turn registers with an aperture 30 in the top of the pump casing as shown in Fig. 4. There is here shown a screw plug 31 for closing an opening providing access to these channels particularly permitting the same to be cleaned readily. Also, the upper face of the member 11 has a groove 32 cut into its face which, as shown in Fig. 3, extends beneath the pump body 16 to a position at the same radial distance from the center of rotation of the shaft 14 as the opening of the passageway 27 to the pump chamber. Thus this groove 32 is open at one end to the pump chamber 17 and is partially covered by the pump body 16. The bottom face of the pump body is held in close contact with the upper face of the pump casing element 11 by means of a spring 40, as shown in Fig. 2. The pump body has a chamber therein forming a cylinder 33. The bottom of the cylinder has a port opening through the bottom wall of the pump by means of a passageway 34 which, as will be understood from Figs. 3 and 4, registers with the opening of the channel 27 through the upper face of the base 11 and then registers with the covered end of the groove 32 due to the oscillatory motion of the pump body 16. In the cylinder 33 is a piston 35 having a stem 36 and a ball 37 on the end thereof. This ball fits in a channel 38 formed radially in the inner face of the casing element 18.

This channel is provided with a contracted throat 39 through which the stem 36 extends and prevents the ball from being moved inwardly of the position shown in Fig. 3. The member 18 also is formed with a boss 40ª to receive the screw 41, the inner end of which extends to or into the channel or way 38 and may be varied in position to permit the ball end 37 to be positioned a greater distance radially from the center of rotation of the shaft 13 than in the position shown and this, as will be understood hereinafter, varies the possible extent of movement of the piston 35 in the cylinder 33 and therefore varies the output of the pump. Obviously, with the parts in the position shown in Fig. 3, the pump will discharge practically the full amount of liquid taken into the cylinder between the bottom of the piston and bottom of the cylinder. By retreating the screw 41 it permits the ball end and consequently the piston 35 to move outwardly of the cylinder oscillation of the pump body 16 to a greater distance as shown in Fig. 6. Thus while it may draw a full amount of liquid into the cylinder will not discharge as much due to the necessity of ball end of the piston having to move outwardly to engage the screw before any liquid may be discharged from the cylinder 33. As before stated, the oscillation of the pump body 16 first brings the aperture 34 to registration with the channel 27 in the pump casing element and thence into the meter body through the aperture 30. This occurs on the discharge stroke of the piston 35.

As the pump body in its oscillation moves to bring the aperture 34 to registration with the inner end of the groove 32, the pump is on the suction stroke and thus takes liquid from the chamber 17 supplied through the inlet conduit 4. The liquid thus taken into the pump cylinder 33 is in sequence again discharged to the aperture 34 so that at each revolution of the meter shaft a measured quantity of the treating liquid is discharged into the liquid in a predetermined proportion to the volume of the liquid being discharged per rotation of the meter shaft.

Various types of pump elements, as before stated, may be utilized but whatever the character of construction of the pump element, the pump in accordance with my invention, is preferably actuated by rotation due to the direct connection between the pump and meter shaft, means being provided to vary the output of the pump and preferably to direct discharge into the meter housing to thereupon become, through operation of the meter, thoroughly mixed with the main body of the liquid passing through the meter.

It will be evident from the foregoing description, that the various novel features of the invention exist in the mounting of the pump element on the meter casing and actuated directly by rotation of the meter to provide a discharge of the treating liquid into the treated liquid measured by the meter revolution and thoroughly mixed in passing to the main body.

It is further to be observed that a material saving is attained by the construction described avoiding the costliness of a separately driven pump such as in previous structures heretofore mentioned and provides a small and compact unit not materially greater in overall dimensions then the meter itself and that within the capacity of the pump and meter which naturally should be of predetermined form for various volumes of liquid to be treated and of the treating liquid to be discharged thereto.

It is therefore believed evident that these various objects and novel features of the invention are attained by the construction described, and that various changes in structure of the parts may be made without departing from the spirit and scope of the invention as set forth in the appended claims.

Having thus fully described my invention, its utility and mode of operation, what I claim and desire to secure by Letters Patent of the United States is:

1. Apparatus of the character described comprising in a unitary structure a flow responsive device having a rotatable shaft and including a casing, a conduit connected with the said casing of the flow responsive device for supplying liquid to be treated thereto, an outlet conduit for the said casing, a pump comprising a cylinder, and a piston, the piston having a portion projecting from one end of the cylinder, a casing for the pump, a conduit having an opening to the pump casing for supplying treating liquid thereto, and a second conduit open to the pump casing and discharging to the casing of the flow responsive device, and means for oscillating the cylinder by rotation of the shaft of the flow responsive device, means pivotally supporting the projecting portion of the piston to cause relative reciprocation of the piston and cylinder by oscillation of the cylinder, said cylinder having an opening at the end opposite that occupied by the piston, oscillation of the cylinder positioning the said opening therein in communication with the interior of the pump casing on the intake stroke of the piston and then in communication with the conduit discharging to the casing of the flow responsive device on the discharge stroke of the piston.

2. Apparatus of the character described comprising in a unitary structure a flow responsive device having a rotatable shaft and including a casing, a pump comprising a piston and a cylinder therefor, a casing for the pump, a conduit for supplying treating liquid to the pump casing, a second conduit opening to the pump casing to receive liquid therefrom and to discharge the same to the casing for the flow responsive device, said cylinder having an opening at one end through which liquid may be received and discharged by relative reciprocation of the piston and cylinder, means pivotally connecting the cylinder to said shaft of the flow responsive device eccentric to the axis of rotation of the shaft whereby rotation of the shaft causes an oscillation of the cylinder, said piston having a portion extending from the end of the cylinder opposite the end having the opening, a seat supporting the said projecting portion permitting the piston to oscillate with the cylinder thereby causing a relative reciprocation of the piston therein to first take treating liquid from the pump casing into the cylinder and to then discharge the same to the second conduit, and means for adjusting the said seat for the piston toward or from the cylinder thereby varying the extent of relative movement of the piston in the cylinder on the discharge stroke to thereby discharge a predetermined volume of the liquid to the casing for the flow responsive device on each revolution of the shaft.

3. Apparatus of the character described, comprising in a unitary structure a flow responsive device including a casing, an inlet and an outlet conduit for the casing of the flow responsive device through which liquid to be treated flows to cause operation of the flow responsive device, a pump comprising a cylinder and a piston therein, a casing for the pump mounted on the casing of the flow responsive device, said flow responsive device having a shaft rotated by its operation, means pivotally connecting the cylinder to the shaft eccentric to the axis of rotation of the shaft to thereby cause oscillation of the cylinder, a conduit for supplying treating liquid to the pump casing, and a second conduit having an opening to the pump casing and discharging to the casing for the flow responsive device, means for pivotally connecting said piston to said pump casing, said pump cylinder having an opening at the end opposite that through which the piston projects, and means whereby through oscillation of the cylinder the said cylinder is placed in communication alternately with the casing to receive liquid from the casing and to discharge said liquid to the second conduit.

4. Apparatus of the character described comprising in a unitary structure a flow responsive device having a rotatable shaft and including a casing, a pump comprising a piston and a cylinder therefor, a casing for the pump, a conduit for supplying treating liquid to the pump casing, a second conduit opening to the pump casing to receive the liquid therefrom and to discharge the same to the casing for the flow responsive device, said cylinder having an opening at one end through which liquid may be received and discharged by relative reciprocation of the piston and cylinder, means pivotally connecting the cylinder to said shaft of the flow responsive device eccentric to the axis of rotation of the shaft whereby rotation of the shaft causes an oscillation of the cylinder, said piston having a portion extending from the end of the cylinder opposite the end having the opening, a seat supporting the said projecting portion permitting the piston to oscillate with the cylinder thereby causing a relative reciprocation of the piston therein to first take treating liquid from the pump casing into the cylinder and to then discharge the same to the second conduit, and means for adjusting the said seat for the piston toward or from the cylinder thereby varying the extent of relative movement of the piston in the cylinder on the discharge stroke to thereby discharge a predetermined volume of the liquid to the casing for the flow responsive device on each revolution of the shaft and for adjusting the relative reciprocation of the piston in the cylinder to thereby vary the volume of treating liquid discharged to the casing of the flow responsive device on each rotation of the said shaft.

EMIL J. FORMHALS.